(12) United States Patent
Morozov et al.

(10) Patent No.: US 11,661,160 B1
(45) Date of Patent: May 30, 2023

(54) LOW FREQUENCY SOUND SOURCE FOR LONG-RANGE GLIDER COMMUNICATION AND NETWORKING

(71) Applicant: TELEDYNE INSTRUMENTS, INC., Thousand Oaks, CA (US)

(72) Inventors: Andrey K. Morozov, North Falmouth, MA (US); Clayton P. Jones, Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 17/455,483

(22) Filed: Nov. 18, 2021

(51) Int. Cl.
| | | |
|---|---|---|
| *B63G 8/39* | (2006.01) | |
| *B06B 1/06* | (2006.01) | |
| *B63G 8/04* | (2006.01) | |
| *G10K 9/22* | (2006.01) | |

(52) U.S. Cl.
CPC .............. *B63G 8/39* (2013.01); *B06B 1/0651* (2013.01); *B63G 8/04* (2013.01); *B06B 2201/74* (2013.01); *G10K 9/22* (2013.01)

(58) Field of Classification Search
CPC .... B06B 1/0651; B06B 2201/74; G10K 9/122
See application file for complete search history.

(56) References Cited

U.S. PATENT DOCUMENTS

| | | | |
|---|---|---|---|
| 2,812,452 A | 11/1957 | Harris et al. | |
| 4,156,824 A | 5/1979 | Pence, Jr. | |
| 4,855,964 A | 8/1989 | Fanning et al. | |
| 5,487,350 A | 1/1996 | Chace, Jr. et al. | |
| 5,537,947 A | 7/1996 | Couture et al. | |
| 5,600,087 A | 2/1997 | Chace, Jr. | |
| 6,814,180 B1 | 11/2004 | Rossby et al. | |
| 8,670,293 B2 | 3/2014 | Morozov | |
| 10,424,284 B2 | 9/2019 | Morozov | |
| 10,882,592 B1 | 1/2021 | Morozov et al. | |
| 11,091,240 B1 * | 8/2021 | Morozov | B63G 8/001 |

(Continued)

OTHER PUBLICATIONS

Barron, Trevor, Deep Siren Long Range Acoustic Communications, Raytheon Network Centric Systems, Poster, The Fourth ACM International Workshop on UnderWater Networks (WUWNet) in Conjunction with ACM SenSys 2009, Berkeley, California, USA, Nov. 3, 2009.

(Continued)

*Primary Examiner* — Bryan P Gordon
(74) *Attorney, Agent, or Firm* — K&L Gates LLP

(57) ABSTRACT

A sound source for acoustic communication, navigation, and networking of an underwater glider may include a cylindrical body, a rigid front section disposed anteriorly to the cylindrical body, a plurality of metal rods, a resonant pipe surrounding the rods, and a rod-mounted piezo-ceramic transducer disposed between the body and the front section. Each rod may be attached at a first end to an anterior portion of the body and at a second end to a posterior portion of the front section. The pipe may be disposed between the body and the front section. The transducer may be disposed within the pipe. A posterior end of the pipe may be separated from the anterior portion of the body by a first orifice, and an anterior end of the pipe may be separated from the posterior portion of the front section by a second orifice.

16 Claims, 9 Drawing Sheets

(56) References Cited

U.S. PATENT DOCUMENTS

2019/0311703 A1* 10/2019 Coffin ................ A61H 23/0245
2019/0389746 A1* 12/2019 Trigiani ................ B06B 1/0215
2020/0322730 A1* 10/2020 Kamiya ................ B06B 1/0651

OTHER PUBLICATIONS

Lee, J. B., Low-frequency Resonant-tube Projector for Underwater Sound, Ocean '74, IEEE International Conference an Engineering in the Ocean Environment, Halifax, Nova Scotia, Canada, Aug. 1974, vol. 2, pp. 10-15.

* cited by examiner

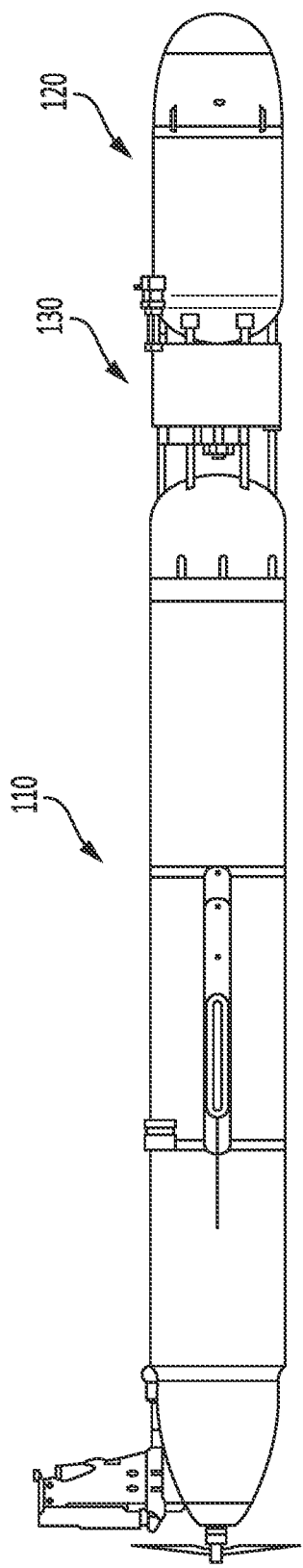
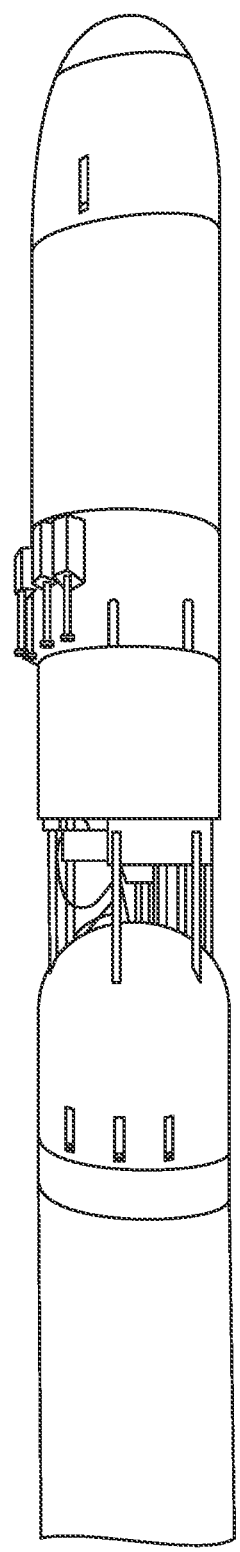
FIG. 3A
FIG. 3B

LOW FREQUENCY SOUND SOURCE FOR LONG-RANGE GLIDER COMMUNICATION AND NETWORKING

STATEMENT OF GOVERNMENTAL INTEREST

The subject matter described in the present disclosure was developed with U.S. Government support under DARPA Timely Information for Maritime Engagement program contract number N66001-20-C-4006. The U.S. Government has certain rights in the subject matter.

BACKGROUND

There is a growing demand for autonomous underwater vehicles (AUV), that can communicate with each other along with land centers through long distance underwater acoustic communication networks. The signal travel time between nodes in underwater networks can be also used for navigation. The modern AUV, and specifically underwater gliders, can cover a large ocean area and gather ocean data through underwater acoustic networks. Such networks of AUVs may increase the efficiency of the ocean operational monitoring in real time and improve the potential coverage of gathered sensor data in the ocean observation networks. In one application, a network of AUVs may be deployed in polar areas, where partial or complete ice cover restricts or makes hazardous the data access from the sea surface. Although the data rate of long-range acoustic communications is much less than that obtained using satellite communications, and the precision of acoustical navigation is less than GPS, nevertheless, underwater acoustic systems may be the only way to provide geo-location and telemetry in ice-covered regions. A compact, light, efficient, depth independent mid- and low-frequency sound source included in the structure of the AUV or glider may be well suited for long-range underwater communication.

To transmit signals underwater to a distance up to 200 kilometers, an AUV may need a small, efficient, transducer transmitting and receiving at a frequency range of about 500 Hz to about 1500 Hz. In this frequency range, the present technology generally relies on rather large piezo-ceramic rings, spheres, and tonpilz transducers, or heavy flextensional and flexural transducers equipped with a pressure gas compensation system. The heavy piezo-ceramic transducers in this frequency range cannot be used on a small AUV, and pressure-compensated systems are depth limited, and not reliable.

Present examples of such acoustic sources for use with an AUV have been disclosed in U.S. Pat. No. 5,537,947 (to Couture et al.), U.S. Pat. No. 5,487,350 (to Chance et al), and U.S. Pat. No. 5,600,087 (to Chance). These examples include the use of a piezo-ceramic ring specifically tuned out of resonance thereby having very low efficiency and only a short-term expendable application. Such a solution is not practical for a long term underwater AUV network.

Some examples of underwater sound sources operating in the frequency range of about 500 Hz to about 1500 Hz may include:

1. Piezo-ceramic rings, spheres and tonpilzs. However, the dimensions of piezo-ceramic transducers working in this frequency band are too large, and transducers are too heavy for a small AUV.
2. Heavy flextensional and flexural transducers equipped with the pressure gas compensation system. However, the pressure-compensated systems are not reliable and depth limited. Additionally, the transducers may be too bulky or heavy for use with a small AUV.

Alternatives to the transducers disclosed above for long term underwater use may include the use of free flooded resonators. They can be reasonably small, and the resonator can use a light carbon fiber composite material. These transducers are very efficient and can support long-range communication for a long time. Unfortunately, free flooded resonators are sensitive to the closed environment (about 1 m for 1500 Hz) in a vehicle body, and can be used only as a part of the AUV design. The problem with all the above-mentioned transducers, and specifically for free flooded resonators, is their sensitivity to the surrounding enclosure. Working on a small vehicle, the source must be designed as part of a whole system. In addition, the vehicle with a sound source should have a streamlined form thereby not increasing its drag coefficient.

The present disclosure is directed to a compact, lightweight, efficient, powerful, and essentially depth independent sound source.

SUMMARY

In one aspect, an underwater sound source may include a cylindrical body, a rigid front section disposed anteriorly to the cylindrical body, a plurality of metal rods, a resonant pipe mounted surrounding the plurality of metal rods, and a spherical piezo-ceramic transducer disposed between the cylindrical body and the rigid front section and mounted on the plurality of metal rods. Each of the plurality of metal rods may be attached at a first end to an anterior portion of the cylindrical body and attached at a second end to a posterior portion of the rigid front section. The resonant pipe may be disposed between the anterior portion of the cylindrical body and the posterior portion of the rigid front section. The spherical piezo-ceramic transducer may be further disposed within the resonant pipe. A posterior end of the resonant pipe may be separated from the anterior portion of the cylindrical body by a first cylindrical orifice, and an anterior end of the resonant pipe may be separated from the posterior portion of the rigid front section by a second cylindrical orifice.

FIGURES

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 3A depicts a realized version of the autonomous underwater vehicle depicted in FIG. 1, according to an aspect of the present disclosure.

FIG. 3B depicts a close-up view of a resonator section of the realized version of the autonomous underwater vehicle depicted in FIG. 3A, according to an aspect of the present disclosure.

DESCRIPTION

Figure 1:
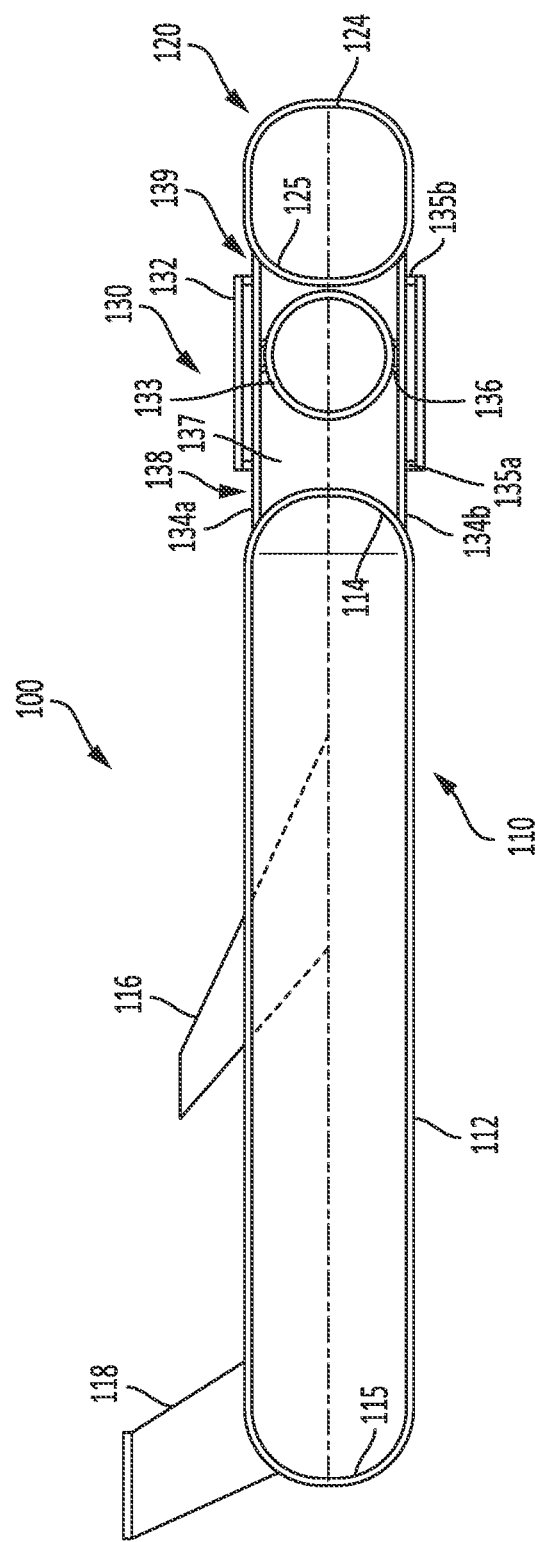
FIG. 1 depicts a diagram of an aspect of an autonomous underwater vehicle, according to an aspect of the present disclosure.

As disclosed above, there is a growing demand for autonomous underwater vehicles (AUV), that can communicate with each other along with land centers through long distance underwater acoustic communication networks. The signal travel time between nodes in underwater networks can be also used for navigation. The modern AUV, and specifically underwater gliders, can cover a large ocean area and gather ocean data through underwater acoustic networks. Such networks of AUVs may increase the efficiency of the ocean operational monitoring in real time. Such system can improve the potential coverage of the ocean observation networks. In one application, such networks of AUVs may be deployed in polar areas, where partial or complete ice cover restricts or makes hazardous the data access from the sea surface. Although the data rate of long-range acoustic communications is much less than that obtained using satellite communications, and the precision of acoustical navigation is less than GPS, nevertheless, underwater acoustic systems may be the only way to provide geo-location and telemetry in ice-covered regions. A compact, light, efficient, depth independent mid- and low-frequency sound source included in the structure of the AUV or glider may be well suited for long-range underwater communication.

Disclosed herein is a component of a long-range communications system for an autonomous underwater vehicle (AUV) acoustic network. To transmit signals underwater to a distance of about 200 kilometers, an AUV needs a small, efficient, transducer that may operate in a frequency range of about 500 Hz to about 1500 Hz. In some non-limiting examples, the operational frequency may be about 500 Hz, about 600 Hz, about 700 Hz, about 800 Hz, about 900 Hz, about 1000 Hz, about 1100 Hz, about 1200 Hz, about 1300 Hz, about 1400 Hz, about 1500 Hz, or any value or range of values therebetween including endpoints. In this frequency range, the present technology includes rather large piezo-ceramic rings, spheres, and tonpilz transducers, or heavy flextensional and flexural transducers equipped with a pressure gas compensation system. The heavy piezo-ceramic transducers in this frequency range are impractical for a small AUV, and pressure-compensated systems are not reliable and are depth limited. An alternative solution may be to use underwater transducers with free flooded resonators. They can be reasonably small, and the resonator can use light carbon fiber composite material. These transducers are very efficient, which is important for autonomous battery powered systems. A problem with these transducers, and specifically for free flooded resonators, is their sensitivity to the surrounding enclosure. Working as part of a small vehicle, the underwater sound source should be designed as part of the entire AUV system. The vehicle, including the sound source, should remain streamlined thereby not increasing its drag coefficient.

One design for a free flooded underwater resonator may be an organ-pipe type resonator. An organ-pipe type resonator, comprising a transducer disposed within a pipe, is typically either a half-wave resonator or a quarter-wave resonator. It may be understood that the pipe of a half-wave resonator is open at both ends, while the pipe of a quarter-wave resonator is sealed at one end. Quarter-wave resonators have an advantage of being shorter than half-wave resonators at the same resonance frequency, and therefore having a shorter profile than the half-wave resonators. As a result, a quarter-wave resonator uses less material and is therefore lighter and less expensive. However, quarter-wave resonators have an antinode (point of maximum pressure) at the end seal of the pipe, which imparts significant vibration to the seal and any structure fixed to it. Half-wave resonators, however, have nodes at each end of the tube, at large open holes, and do not vibrate much at either end. It would useful to have an underwater resonator that is closer in length to a quarter-wave resonator pipe, while avoiding the end vibration problem at the quarter-wave resonator. The present disclosure provides an underwater resonator device that addresses these issues.

Figure 2:
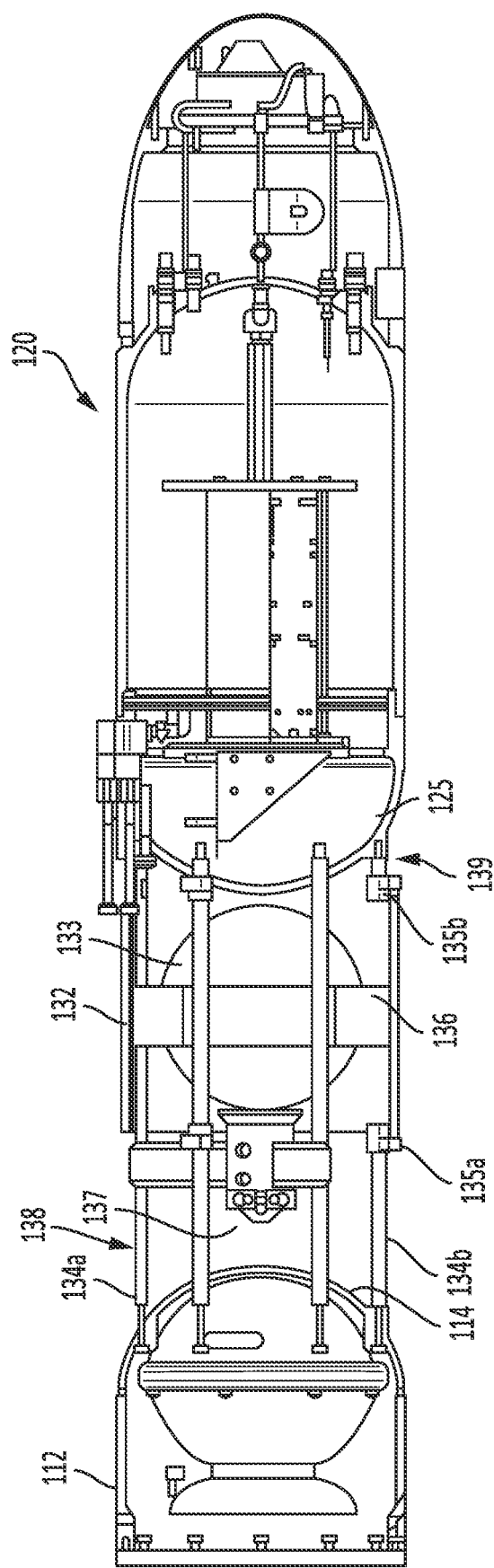
FIG. 2 depicts a close-up view of an anterior section of the autonomous underwater vehicle depicted in FIG. 1, according to an aspect of the present disclosure.

FIGS. 1 and 2 depict aspects of a sound source for use with an AUV. FIG. 1 depicts a diagram of the aspect of the AUV, and FIG. 2 depicts a close-up view of a resonator and a rigid front section of the AUV depicted in FIG. 1 In this aspect, the AUV 100 includes a glider body 110, a rigid front section 120, and a resonator 130 disposed therebetween. The glider body 110 may include a cylindrical body 112, a glider rear endcap 115, and an anterior endcap 114 affixed to an anterior portion of the cylindrical body 112. The glider body 110 may include a buoyancy engine designed to maintain the AUV at a controlled depth, and to propel the AUV along a predetermined underwater path. In some aspects, the anterior endcap 114 may be a flat endcap. In other aspects, the anterior endcap 114 may be a convex hemispherical endcap (the convex surface facing the rigid front section 120 and the resonator 130 as depicted in FIG. 1). In some aspects, the AUV may include multiple horizontal wings 116 and a vertical tail fin 118 associated with the glider body 110. The multiple horizontal wings 116 may be used to control a depth of the AUV during forward motion, and the vertical tail fin 118 may stabilize the AUV against roll or yaw. In some examples, the cylindrical body 112 may be fabricated from aluminum. In some alternative examples, the cylindrical body 112 may be fabricated from a light carbon fiber composite material.

The rigid front section 120 may be composed of a front endcap 124, and a posterior endcap 125 affixed to a posterior portion of the rigid front section 120. In some aspects, the posterior endcap 125 may be flat. In other aspects, the posterior endcap 125 may be a convex hemispherical endcap (the convex surface facing the glider body 110 and the resonator 130 as depicted in FIG. 1).

The resonator 130 may include a spherical piezo-ceramic transducer 133 disposed between the anterior endcap 114 and the posterior endcap 125. In some aspects, the spherical piezo-ceramic transducer 133 may be disposed proximate to the posterior endcap 125 of the rigid front section 120. In one example, the spherical piezo-ceramic transducer 133 may be separated in a distal direction by about 0.25 inches (0.64 cm) from the posterior endcap 125. The spherical piezo-ceramic transducer 133 must be strong enough to withhold the static water pressure at the operation depth. For example, an approximately 6 inch (15.2 cm) spherical piezo-ceramic transducer fabricated from PZT-4 piezo-ceramic having a thickness of about 0.25 inch (0.64 cm) can withstand pressures found at about 1.25 km water depth. The spherical piezo-ceramic transducer 133 may be held in place by one or more shock mounts 136 attached to a plurality of metal rods 134a,b. Each of the one or more shock mounts 136 may have a first end in mechanical communication with a portion of a surface of at least one of the plurality of metal rods 134a,b. Further, each of the one or more shock mounts 136 may have a second end in mechanical communication with a portion of an outer surface of the spherical piezo-ceramic transducer 133. Each of the plurality of metal rods 134a,b may be attached at a first end to the anterior portion of the cylindrical body 112 and may be attached at a second end to the posterior portion of the rigid front section 120. In some non-limiting examples, the plurality of metal rods 134a,b may include three metal rods. In some non-limiting examples, each of the plurality of metal rods 134a,b may be about 15.94 inches (40.5 cm) in length.

The resonator 130 may also include a resonant pipe 132 also mounted surrounding the plurality of metal rods 134a,b and disposed between the anterior portion of the cylindrical body 112 and the posterior portion of the rigid front section 120. The resonant pipe 132 may be mounted on the plurality of metal rods 134a,b via at least one plastic mount 135a,b. The at least one plastic mount 135 a,b may have a first end in mechanical communication with a portion of a surface of at least one of the plurality of metal rods 134a,b, and a second end in mechanical communication with a portion of an inner surface of the resonant pipe 132. It may thus be understood that the resonant pipe 132 is dispose surrounding the plurality of metal rods 134a,b. It may further be understood that the piezo-ceramic transducer 133 is further disposed within the resonant pipe 132. The resonant pipe 132 may have a longitudinal pipe axis that is coaxial with a longitudinal axis of the cylindrical body 112 and coaxial with a longitudinal axis of the rigid front portion 120. In some aspects, the resonant pipe 132 may be fabricated from aluminum 6061T6. In some aspects, the resonant pipe 132 may have a wall thickness between about 0.125 inches (about 0.32 cm) and about 0.375 inches (about 0.95 cm). In some non-limiting examples, the wall thickness of the resonant pipe 132 may be about 0.125 inches (about 0.32 cm), about 0.25 inches (about 0.64 cm), about 0.375 inches (about 0.95 cm), or any value or range of values therebetween including endpoints. In some aspects, the resonant pipe 132 may be fabricated from any stiff material such as a light carbon-fiber composite material. In some examples, the carbon fiber composite may be a preferred material because it is stiffer and lighter than aluminum. In some aspects, the resonant pipe 132 may have a length of about 7 inches (about 17.8 cm) to about 15 inches (about 38.1 cm). In some non-limiting examples, the resonant pipe 132 may have a length of about 7 inches (about 17.8 cm), about 10 inches (about 25.4 cm), about 12.5 inches (about 31.8 cm), about 15 inches (about 38.1 cm), or any value or ranges therebetween including endpoints.

As disclosed above, the resonant pipe 132, may be mounted surrounding the plurality of metal rods 134a,b via the at least one plastic mount 135a,b. The open ends of the resonant pipe 132 make no physical contact with either the anterior portion of the cylindrical body 112 or the posterior portion of the rigid front section 120. Thus, a first cylindrical orifice 138 separates a posterior end of the resonant pipe 132 from the anterior portion of the cylindrical body 112 and the anterior endcap 114. A second cylindrical orifice 139 separates an anterior end of the resonant pipe 132 from the posterior portion of the rigid front section 120 and the posterior endcap 125. In some aspects, a width of the second cylindrical orifice 139 may be smaller than a width of the first cylindrical orifice 138. As noted above, in some non-limiting examples, the resonant pipe 132 may have a length of about 7 inches (about 17.8 cm), about 10 inches (about 25.4 cm), about 12.5 inches (about 31.8 cm), about 15 inches (about 38.1 cm). Each of the resonant pipes 132 may be fixed to the metal rods 134a,b at a predetermined distance from the posterior endcap 125 of the front rigid section 120. The predetermined distance may thus define the width of the second cylindrical orifice 139. In one non-limiting example, the second cylindrical orifice 139 may have a width of about 1.6 inches (about 4.1 cm).

Because each of the resonant pipes 132 may be fixed to the metal rods 134a,b at a predetermined distance from the posterior endcap 125, the width of the second cylindrical orifice 139 may be maintained at about 1.6 inches (4.1 cm) regardless of the length of the resonant pipe 132. However, the width of the first cylindrical orifice 138 may depend on the length of the resonant pipe 132. Thus, for example, the width of the first cylindrical orifice 138 may be about 6.2 inches (about 15.7 cm) for a resonant pipe 132 having a length of about 7.5 inches (about 19.0 cm) when affixed to metal rods 134a,b having a length of about 15.94 inches (about 19.0 cm). It may be therefore understood that a 7 inch (about 19.0 cm) resonant pipe may have a first cylindrical orifice 138 of about 6.7 inches (about 17.0 cm), a 10 inch (about 25.4 cm) resonant pipe may have a first cylindrical orifice 138 of about 3.7 inches (about 9.4 cm), and a 12.5 inch (about 31.8 cm) resonant pipe may have a first cylindrical orifice 138 of about 1.2 inches (about 3.0 cm) when attached to metals rods 134a,b, having a length of about 15.94 inches (about 40.5 cm). It may be understood that a 15 inch (about 38.1 cm) long resonant pipe 132 may require metal rods 134a,b longer than 15.94 inches (about 40.5 cm) for use in the exemplary device.

As depicted in FIGS. 1 and 2, the spherical piezo-ceramic transducer 133 mounted on the plurality of metal rods 134a,b may be disposed within a cavity 137 defined by an interior volume of the resonant pipe 132. The cavity 137 may be in fluid communication with an external underwater environment when the AUV 100 is submerged. Thus, an exterior surface of the spherical piezo-ceramic transducer 133 and an interior volume of the resonant pipe 132 may also be in fluid communication with the external underwater environment. Upon electrical activation, the spherical piezo-ceramic transducer 133 may oscillate in a radial direction, thus forming pressure waves in the water contained in the cavity 137. If the first cylindrical orifice 138 is wider than the second cylindrical orifice 139, the generated pressure waves may radiate as sound almost exclusively through the first cylindrical orifice 138. For sound sources in which the width of the first cylindrical orifice 138 is larger than the width of the second cylindrical orifice 139, little water flow may pass through the second cylindrical orifice 139. Instead, the second cylindrical orifice 139 may serve to relieve pressure at or near the anti-nodal point of the sound resonance. Since the radiation from the first cylindrical orifice 138 is dominant, the sound source can act as an acoustic monopole with an omnidirectional emission pattern. In some aspects, the anterior endcap 114 may have a hemispherical shape to help radially disperse the acoustic energy within the cavity 137 orthogonally from the longitudinal axis of the AUV at the first cylindrical orifice 138. Similarly, the posterior endcap 125 may have a hemispherical shape to help disperse the acoustic pressure within the cavity 137 at the second cylindrical orifice 139.

FIGS. 3A and 3B depict a realized version of the autonomous underwater vehicle (AUV) depicted schematically in FIG. 1. In particular, FIG. 3A points out the glider body 110, the resonator section 130, and the rigid front section 120. FIG. 3B is a close-up view of the resonator section 130 and the rigid front section 120.

Figure 4:
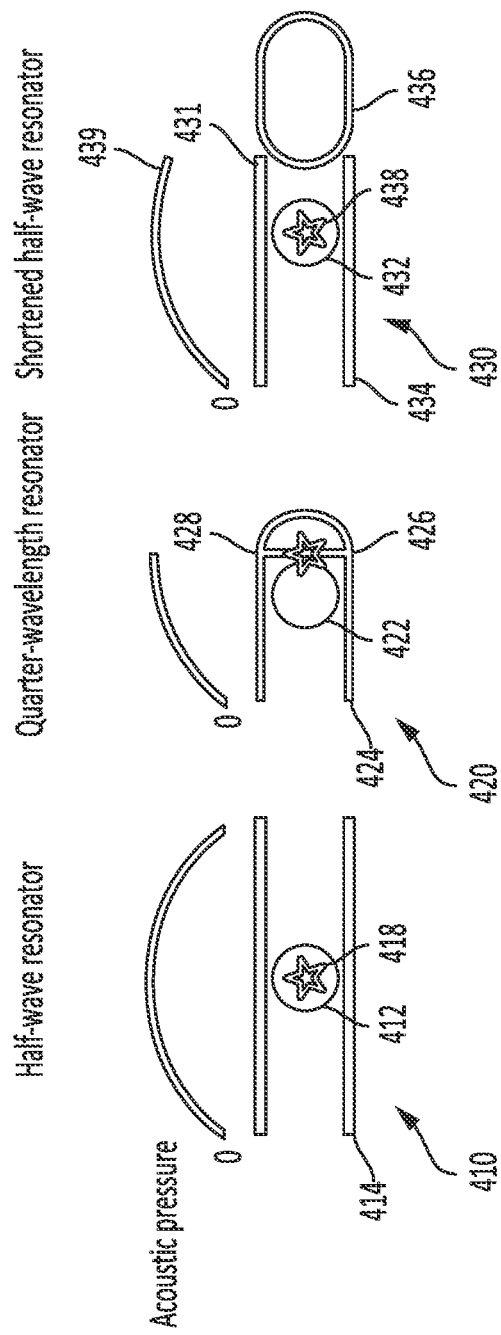
FIG. 4 is a diagram depicting the differences of acoustic pressure for a half-wave, quarter wave, and shortened half-wave resonator, according to an aspect of the present disclosure.

The design of the resonator section 130 of the AUV provides many advantages over alternative AUV designs. FIG. 4 illustrates some of the principles involved in the design. FIG. 4 illustrates various configurations of organ pipe resonator structures. A half wave resonator 410 is characterized by open ends at both sides of the resonant tube 414. The acoustic resonance condition is met when the acoustic wave within the resonant tube 414 has its nodal points (area of minimal acoustic pressure) disposed at the open ends of the resonant tube 414. Thus, the acoustic output of the half-wave resonator 410 may occur at both of the open ends of the resonant tube 414. This condition corresponds to a resonance at an acoustic wavelength twice the length of the resonant tube 414. An oscillator 412 may be disposed halfway within the resonant tube 414. The center of the oscillator 412 may then be located at the anti-nodal point 418 corresponding to the place of maximal acoustic pressure. In this manner, the output of the oscillator 412 is optimized to the half-wave geometry.

A quarter-wave resonator 420 is composed of a resonant tube 424 having one open end and one sealed end 426. In the quarter-wave resonator 420, the acoustic resonant condition comprises a nodal point (low pressure) at the open end of the resonant tube 424, and an antinodal point 428 (high pressure) at the sealed end of the resonant tube 424. The acoustic output of the quarter-wave resonator 420 occurs at the single open end of the resonant tube 424. The oscillator 422 may be located as close as possible to the anti-nodal point 428 to maximize the acoustic output.

It may be recognized that the resonant tube 424 of the quarter wave resonator 420 is half the length of the half-wave resonator 410 at the same output frequency. Therefore, an AUV using a quarter-wave resonator may be shorter than an AUV using an equivalent half-wave resonator. Because the quarter-wave resonator tube 424 is half the length of the half-wave resonator tube 414, it is lighter and makes the entire system less costly than the longer tube. Additionally, the quarter-wave resonator 420 is a monopolar resonator as opposed to a half-wave resonator 410, which is a dipole. However, the anti-nodal point 428 of the quarter-wave resonator tube 424—that is, the point of greatest acoustic pressure—is at the sealed end 426, and the center of the spherical acoustic oscillator 422 cannot be aligned with this anit-node to emit energy at the maximum source level. In addition, the vibrations at the sealed end 426 may be transmitted into the AUV body. These vibrations may interfere with any drive mechanisms, electronics, and precise sensors deployed within the AUV body.

The resonator 130 of the present disclosure may be considered a "shortened half-wave resonator" (430 in FIG. 4). In this configuration, the resonant tube 434 is open at one end and mostly occluded by a rigid front section 436 at the other end. The occluded end 431 of the resonant tube acts to relieve acoustic pressure 439 that may build up at the occluded end 431 and to shift the maximum of the internal mode from the end of the resonator. However, this internal acoustic mode shape makes the resonator longer. The occluded end 431 is open to the water, and the rigid front section 436 does not contact the occluded end 431 of the resonant tube 434. As a result of this geometry, and the acoustic mode shift, the resonant tube 434 can be slightly longer than a resonant tube 424 for an equivalent quarter wave resonator 420 but does not need to be as long as the resonant tube 414 for a half-wave resonator 410. Additionally, since the occluded end 431 is only wide enough to release acoustic pressure, the shortened half-wave resonator 430 also acts as a monopolar resonator, like a quarter-wave resonator 420. The oscillator 432 of the shortened half-wave resonator 430 may be placed near the antinodal position 438, thereby optimizing its acoustic output. It may be recognized that the antinodal position 438 may not be located at the geometric center of the resonant tube 434 (for example as observed with the half-wave resonator 410). Therefore, the oscillator 432 may be disposed close to the rigid front section 436 that forms the occlusion. The open end of the resonant tube 434 may be disposed towards the AUV body and the acoustic energy may be dispersed in a radial manner from that position.

Figure 5:
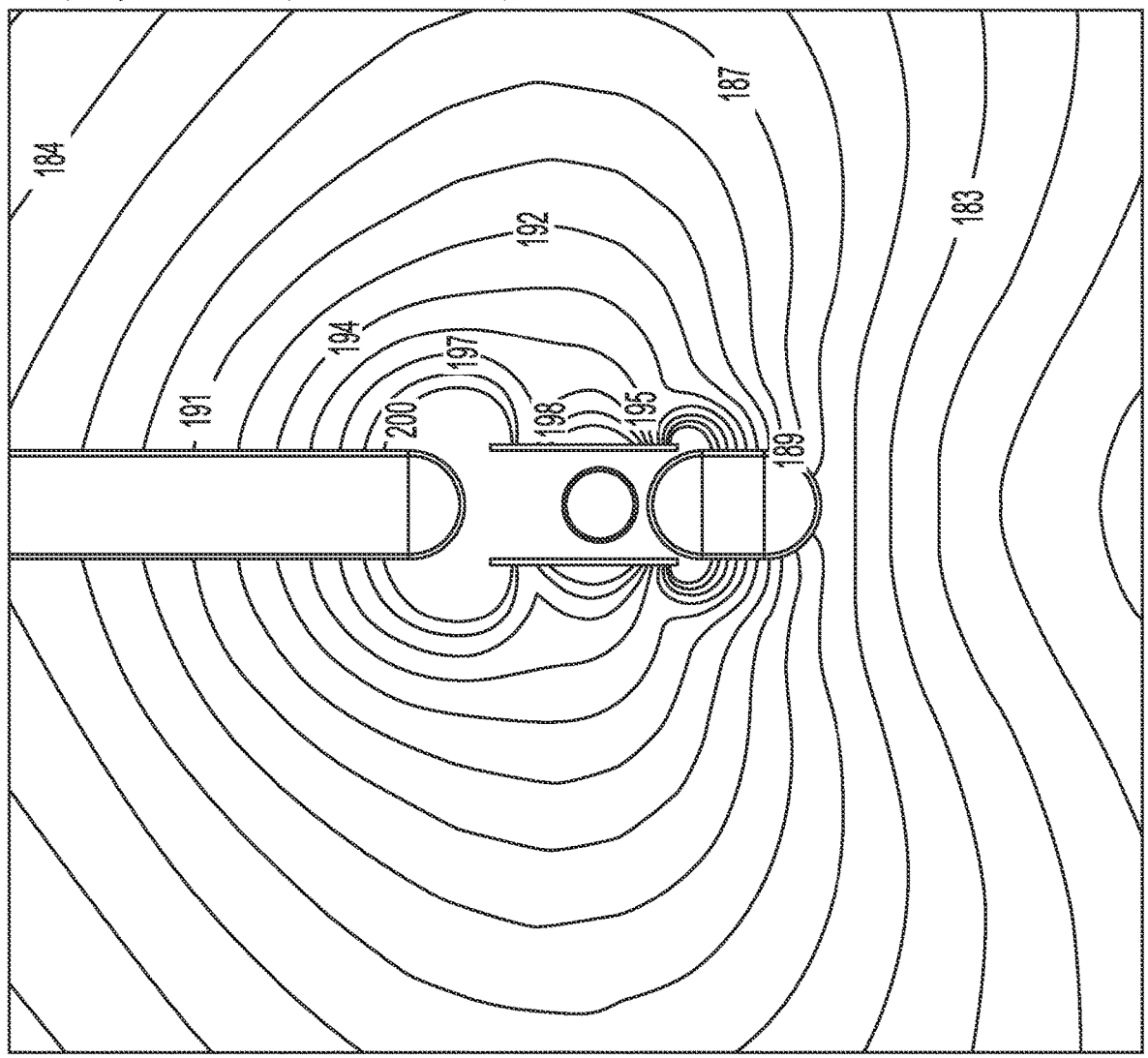
FIG. 5 is a simulation of a sound pressure level spatial distribution of the autonomous underwater vehicle depicted in FIG. 1, according to an aspect of the present disclosure.

The operation of the sound source 100 depicted in FIG. 1 was simulated by a computer using finite-element analysis. The analysis considers pressure acoustics, solid state acoustics, acoustic-structural boundary interface, piezo-acoustics, and the perfect matched layer (PML) with radiation conditions within a 3 m sphere surrounding the sound source. FIG. 5 is a graph of the results of such a simulation of the operation of the resonator 130 incorporated in AUV 100. FIG. 5 illustrates the spatial distribution of the sound pressure level around the AUV 100. The following parameters were used in the simulation:

Parameters of the piezo-ceramic transducer ring:
Material: PZT-4;
Transducer sphere thickness: 0.25 inch (0.64 cm);
Transducer sphere diameter: 6 inches (15.2 cm);
RMS voltage of the transducer sphere driving signal: — 500 V.

The piezo-ceramic transducer was operated at 920 Hz for the simulation depicted in FIG. 5.

Parameters of the resonant pipe:
Material: aluminum 6061 T6;
Length: 15 inches (38.1 cm);
Inside diameter: 9 inches (22.9 cm);
Wall thickness: 0.33 inches (0.86 cm);
Width along the glider axis of the first cylindrical orifice: 6.2 inches (15.7 cm);
Width along the glider axis of the second cylindrical orifice: 2 inches (5.1 cm).

Parameters of the AUV body (modeled as an air-filled cylinder):
Material: aluminum 6061 T6;
Inside diameter: 8 inches (20.3 cm);
Wall thickness: 0.5 inch (1.3 cm);

The endcaps of the cylinder were modeled as hemispheres of the same material and thickness as the body of the AUV. The physical parameters of the model are close to those of a typical shallow water glider.

It may be observed that the sound source creates a radial sound pressure distribution orthogonal to the longitudinal axis of the body of the AUV. The primary acoustic output is located orthogonal to the first cylindrical orifice, near the anterior section of the glider body. A smaller, secondary acoustic output is located orthogonal to the second cylindrical orifice near the posterior section of the rigid front section.

Figure 6:
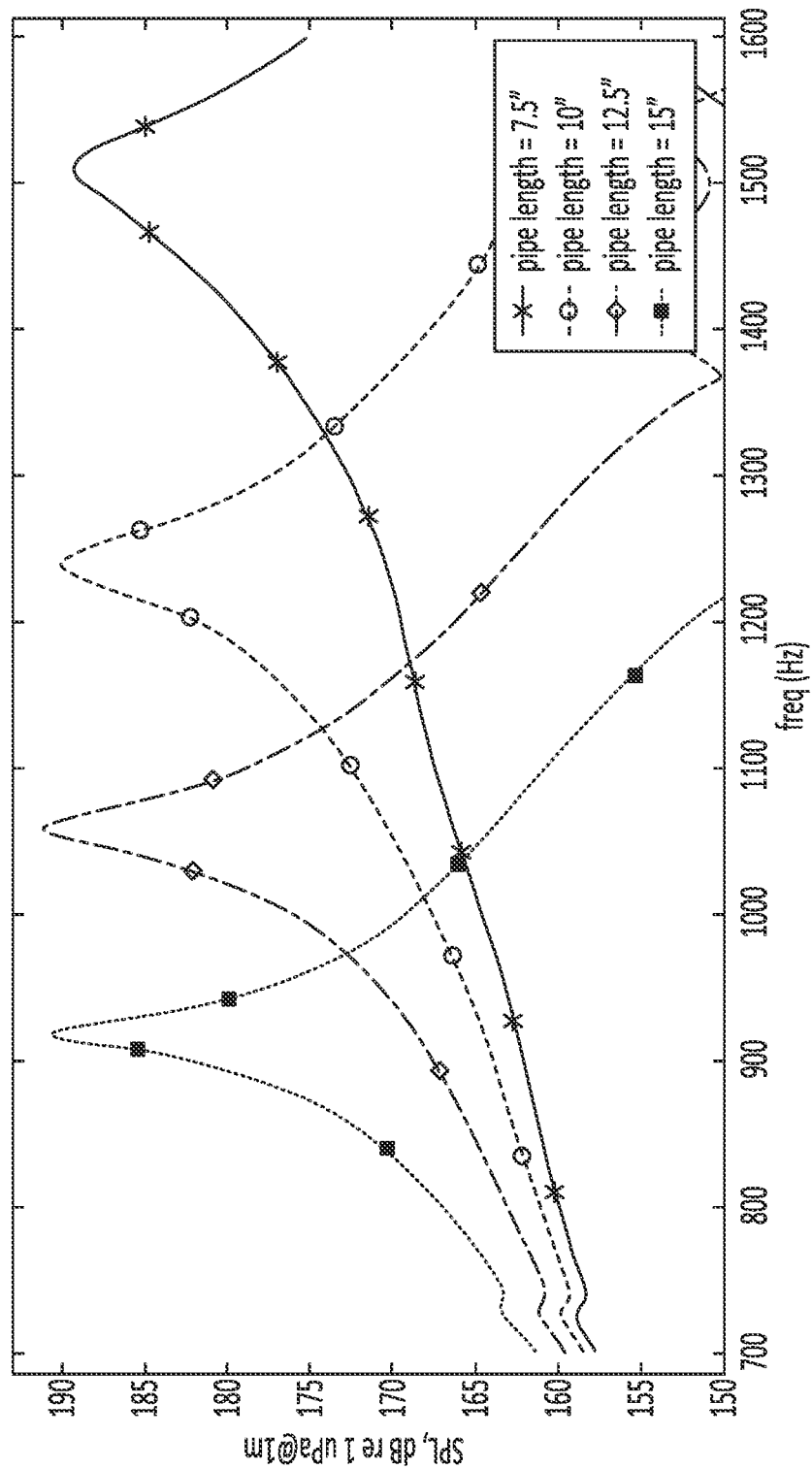
FIG. 6 is a simulation of the frequency dependence of a source level at varying resonant pipe lengths of the autonomous underwater vehicle depicted in FIG. 1, according to an aspect of the present disclosure.

FIG. 6 is a simulation of the frequency dependence of the sound pressure level (SPL) for the AUV depicted in FIG. 1. It was modeled using the parameters disclosed above for the simulation depicted in FIG. 5. The values were simulated at a location about 39.4 inches (1 m) from the center of the cavity and along an axis at the center of the first cylindrical orifice and orthogonal to the longitudinal axis of the AUV body. In the graph in FIG. 6, the frequency dependence of the SPL is plotted for a variety of resonant pipes having lengths of 7.5 inches (19.1 cm), 10 inches (25.4 cm), 12.5 inches (31.8 cm), and 15 inches (38.1 cm). The range in frequencies were modeled over a range from 700 Hz to 1600 Hz. It may be observed in FIG. 6 that the maximum relative pressure level generally is independent on the pipe length, although the maximum resonant frequency decreases with pipe length. Thus, the maximum resonant frequency is about 1509 Hz for the 7.5 inch (19.1 cm) pipe, about 1242 Hz for the 10 inch (25.4 cm) pipe, about 1060 Hz for the 12.5 inch (31.8 cm) pipe, and about 920 Hz for the 15 inch (38.1 cm) pipe. To show the range of possible resonant frequencies in the simulation, the length of the rods was increased to 23.6 inches (59.9 cm). In the prototype, which was built and tested specifically for a resonant frequency of 1500 Hz, the rods were 15.94 inches long. It may be further observed that the width of the pressure curve increases (broadens) as the pipe length decreases.

Figure 7:
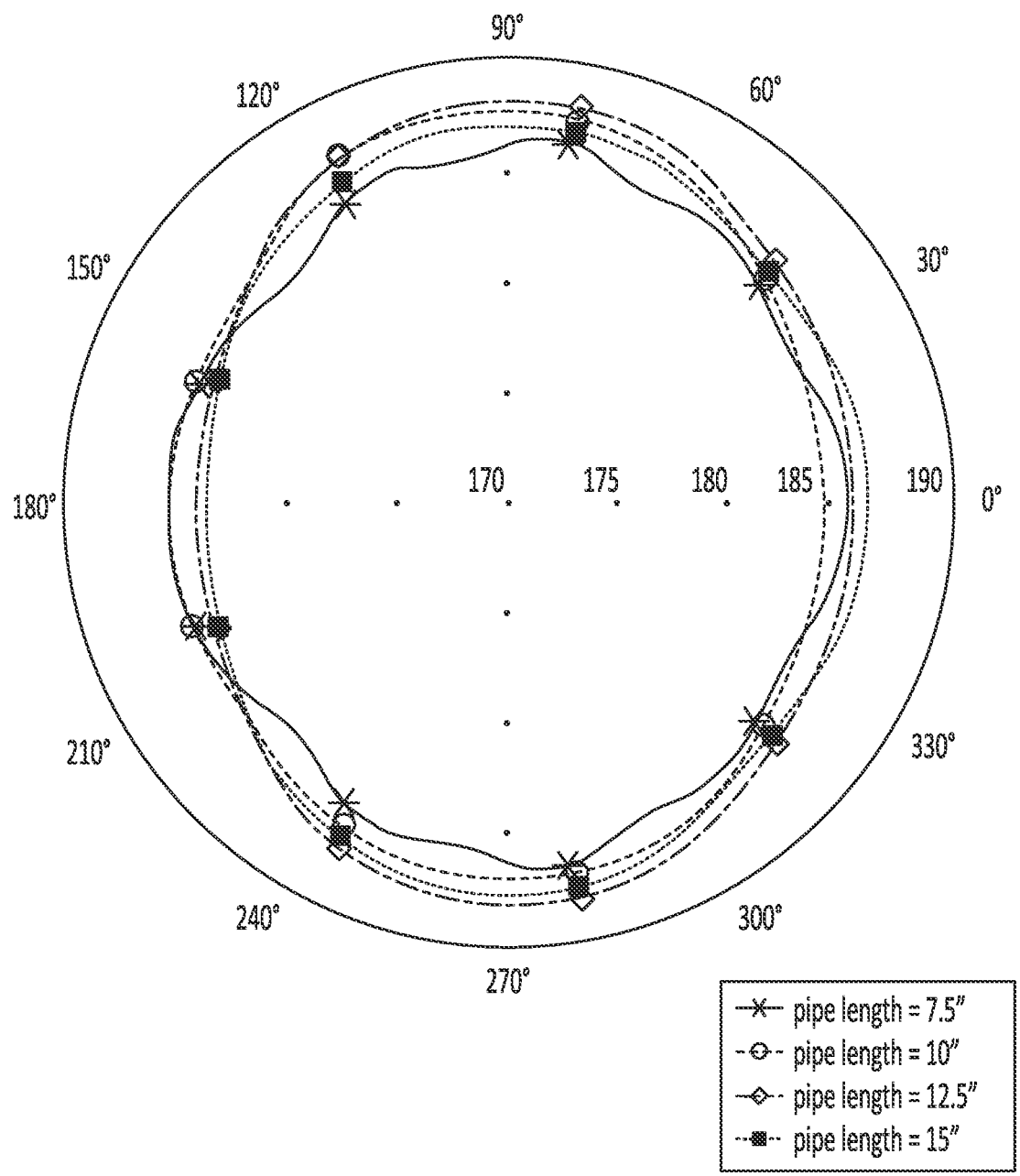
FIG. 7 is a simulation of a radiation pattern of a plurality of resonant pipes of the autonomous underwater vehicle depicted in FIG. 1, according to an aspect of the present disclosure.

FIG. 7 is a graph of a simulation of the radial radiation pattern (SPL) of resonant pipes having different resonant pipe lengths (7.5 inches (about 19.1 cm), 10 inches (about 25.4 cm), 12.5 inches (about 31.8 cm), and 15 inches (3 about 8.1 cm)) at their respective resonance frequencies (as disclosed above). While the radiation pattern is not entirely circular in simulation—it may be more ovoid—the shape of the radiation pattern does not appear very dependent on the length of the resonant pipe except at the shortest pipe length, 7.5 inches (19.1 cm).

Figure 8:
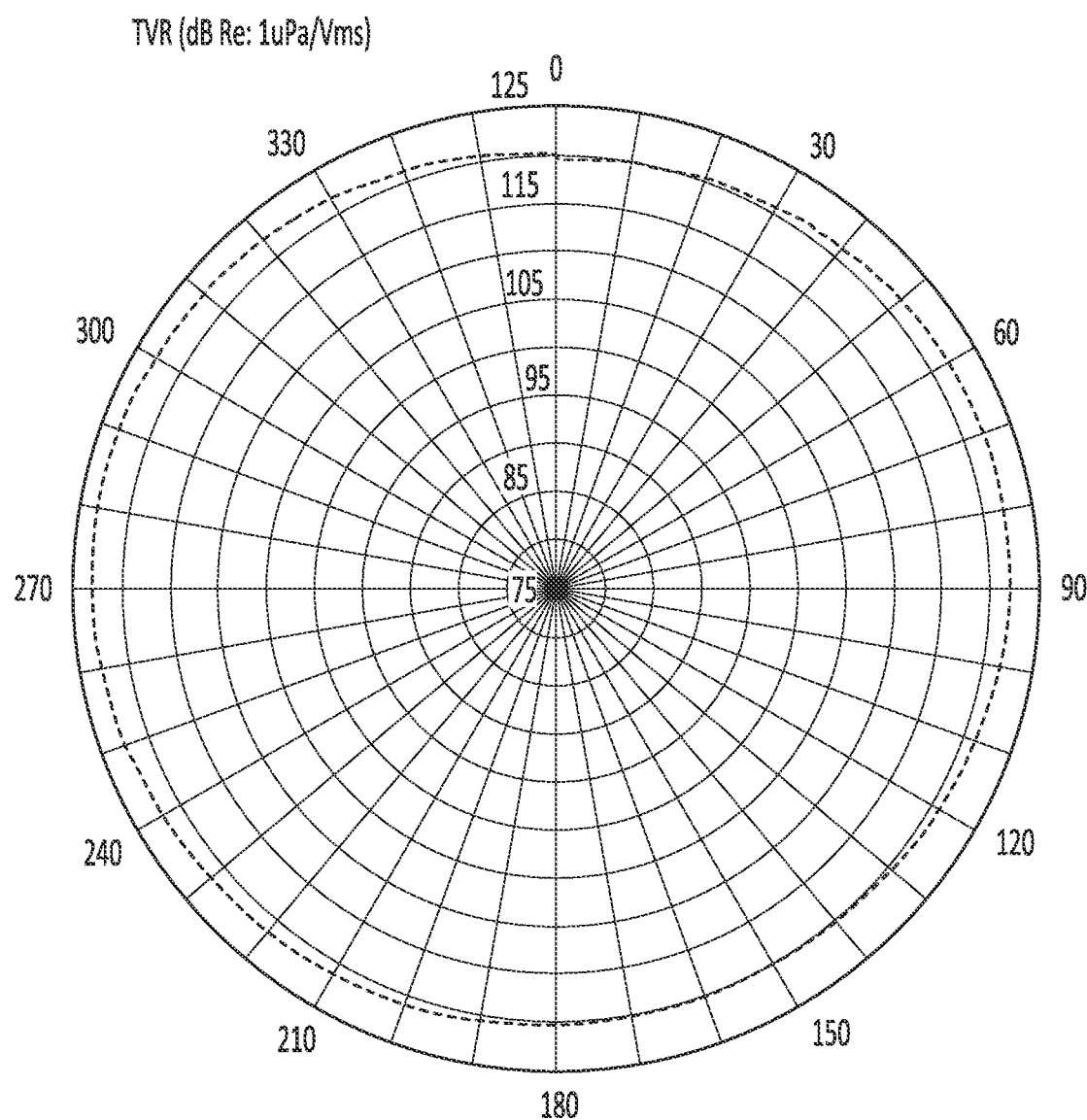
FIG. 8 is a measured radiation pattern of the autonomous underwater vehicle depicted in FIG. 3A, according to an aspect of the present disclosure.

FIG. 8 is a graph of a measured radial radiation pattern (SPL) emitted by the underwater vehicle depicted in FIGS. 3A and 3B. The resonant tube length was 7.5 inches (19.1 cm), the first cylindrical orifice had a width of 8.9 inches (22.6 cm), and the second cylindrical orifice had a width of 4 inches (10.2 cm). The inner diameter of the cylindrical resonator was 8 inches (20.3 cm), and the wall thickness was 0.25 inches (0.64 cm). The resonator was build from the aluminum 6061 T6 (see FIG. 2). The oscillator was operated at 1450 Hz and the measurement was made 39.4 inches (1 m) from the center of the cavity of the resonator. It can be observed that the measured radiation patterns appears more circular (omnidirectional) than depicted in the simulation graph (FIG. 7).

Figure 9:
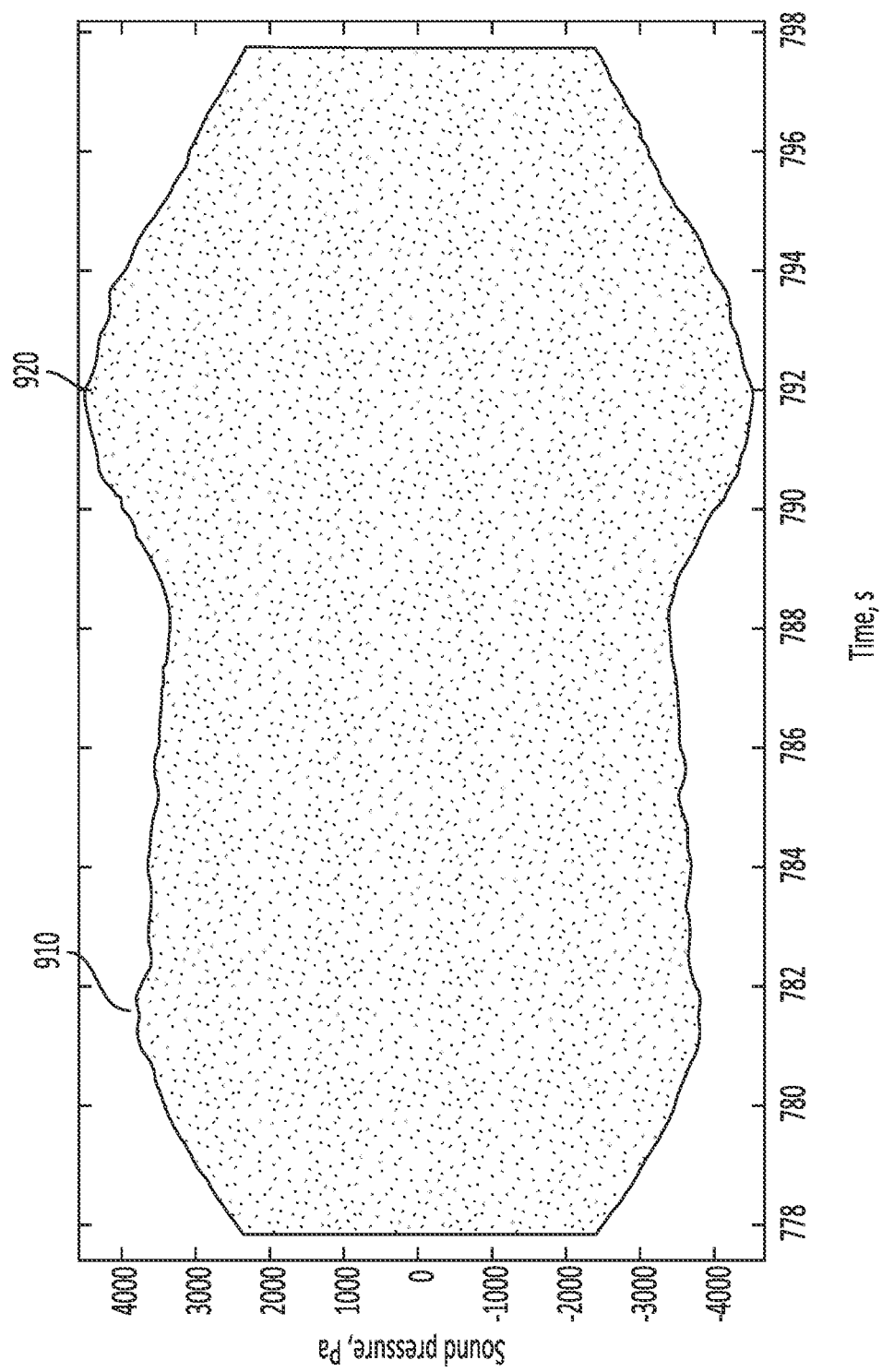
FIG. 9 is a measured envelope of sound output pressure of a linearly swept acoustic signal from 1400 Hz to 1600 Hz of the autonomous underwater vehicle depicted in FIG. 3A, according to an aspect of the present disclosure.

FIG. 9 is a graph of a measured sound output emitted by the underwater vehicle depicted in FIGS. 3A and 3B when the oscillator was frequency swept between 1400 Hz (at time stamp 778 sec.) and 1600 Hz (at time stamp 798 sec.) over a 20 second period. The AUV was submerged in a freshwater pond for this measurement. The frequency sweep was linear, at about 10 Hz/sec. It may be observed that the output sound pressure envelope was generally flat throughout the sweep. Two low-Q resonances may be observed, a first low-Q resonance 910 at about 1435 Hz (about 781.5 seconds) and a second low-Q resonance 920 at 1540 Hz (about 782 seconds). These resonances may be due to the specifics of the internal power amplifier driving the oscillator, and do not appear to be related to the geometry of the resonator.

The underwater vehicle depicted in FIGS. 3A and 3B were subjected to a number of operational tests in a test tank, in a freshwater pond, and in an ocean environment. The devices were tested at depths between 20 m and 750 m, and demonstrated an acoustic response that was both depth and temperature independent.

Reference throughout the specification to "various embodiments," "some embodiments," "one embodiment," "an embodiment", "one aspect," "an aspect" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures or characteristics may be combined in any suitable manner in one or more aspects. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

While various details have been set forth in the foregoing description, it will be appreciated that the various aspects of the present disclosure may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. An underwater sound source, comprising:
    a cylindrical body;
    a rigid front section disposed anteriorly to the cylindrical body;
    a plurality of metal rods, wherein each of the plurality of metal rods is attached at a first end to an anterior portion of the cylindrical body and attached at a second end to a posterior portion of the rigid front section;
    a resonant pipe mounted surrounding the plurality of metal rods and disposed between the anterior portion of the cylindrical body and the posterior portion of the rigid front section; and
    a spherical piezo-ceramic transducer disposed between the cylindrical body and the rigid front section and mounted on the plurality of metal rods,
    wherein the spherical piezo-ceramic transducer is further disposed within the resonant pipe,
    wherein a posterior end of the resonant pipe is separated from the anterior portion of the cylindrical body by a first cylindrical orifice, and
    wherein an anterior end of the resonant pipe is separated from the posterior portion of the rigid front section by a second cylindrical orifice.

2. The underwater sound source of claim 1, further comprising an anterior endcap affixed to the anterior portion of the cylindrical body.

3. The underwater sound source of claim 2, wherein the anterior endcap has a convex hemispherical shape.

4. The underwater sound source of claim 2, further comprising a posterior endcap affixed to the posterior portion of the rigid front section.

5. The underwater sound source of claim 4, wherein the spherical piezo-ceramic transducer is disposed proximate to the posterior endcap.

6. The underwater sound source of claim 4, wherein the posterior endcap has a convex hemispherical shape.

7. The underwater sound source of claim 4, wherein a width of the first cylindrical orifice is greater than a width of the second cylindrical orifice.

8. The underwater sound source of claim 7, wherein the resonant pipe, the anterior endcap, and the posterior endcap form a shortened half-wave resonator cavity.

9. The underwater sound source of claim 1, wherein an exterior surface of the spherical piezo-ceramic transducer and an interior volume of the resonant pipe and are configured to be in fluid communication with an external underwater environment.

10. The underwater sound source of claim 1, further comprising at least one shock mount, wherein the at least one shock mount has a first end in mechanical communication with a portion of a surface of at least one of the plurality of metal rods, and a second end in mechanical communication with a portion of an outer surface of the spherical piezo-ceramic transducer.

11. The underwater sound source of claim 1, further comprising at least one plastic mount, wherein the at least one plastic mount has a first end in mechanical communication with a portion of a surface of at least one of the plurality of metal rods, and a second end in mechanical communication with a portion of an inner surface of the resonant pipe.

12. The underwater sound source of claim 1, wherein the cylindrical body is fabricated from aluminum.

13. The underwater sound source of claim 1, wherein the cylindrical body is fabricated from a light carbon fiber composite material.

14. The underwater sound source of claim 1, wherein the spherical piezo-ceramic transducer is configured to resonate at a frequency of 500 Hz to 1400 Hz.

15. The underwater sound source of claim 1, wherein the resonant pipe is fabricated from aluminum 6061T6.

16. The underwater sound source of claim 15, wherein the resonant pipe has a thickness between 0.125 inches and 0.375 inches.

* * * * *